United States Patent
Hrle et al.

(10) Patent No.: US 8,954,407 B2
(45) Date of Patent: Feb. 10, 2015

(54) SYSTEM AND METHOD FOR PARTIALLY DEFERRED INDEX MAINTENANCE

(75) Inventors: Namik Hrle, Boeblingen (DE);
Johannes Schuetzner, Boeblingen (DE);
Knut Stolze, Jena (DE)

(73) Assignee: International Business Machines Corporation, Armonk, NY (US)

( * ) Notice: Subject to any disclaimer, the term of this patent is extended or adjusted under 35 U.S.C. 154(b) by 312 days.

(21) Appl. No.: 13/085,281

(22) Filed: Apr. 12, 2011

(65) Prior Publication Data

US 2012/0016851 A1    Jan. 19, 2012

(30) Foreign Application Priority Data

Jul. 13, 2010   (EP) .................................... 10169375

(51) Int. Cl.
*G06F 7/00*      (2006.01)
*G06F 17/00*     (2006.01)
*G06F 17/30*     (2006.01)

(52) U.S. Cl.
CPC ................................ *G06F 17/30327* (2013.01)
USPC ............ 707/696; 707/759; 707/746; 707/714

(58) Field of Classification Search
CPC ..................... G06F 17/30321; G06F 17/30336
USPC ........................................................ 707/696
See application file for complete search history.

(56) References Cited

U.S. PATENT DOCUMENTS

| | | | |
|---|---|---|---|
| 5,404,510 A | 4/1995 | Smith et al. | |
| 5,806,058 A | 9/1998 | Mori et al. | |
| 6,466,942 B1 | 10/2002 | Tolkin | |
| 6,694,323 B2 | 2/2004 | Bumbulis | |
| 7,028,022 B1* | 4/2006 | Lightstone et al. | ................... 1/1 |
| 2002/0120617 A1 | 8/2002 | Yoshiyama et al. | |
| 2006/0074977 A1* | 4/2006 | Kothuri et al. | ............. 707/104.1 |
| 2006/0294058 A1 | 12/2006 | Zabback et al. | |

(Continued)

FOREIGN PATENT DOCUMENTS

CN          101286160 A      10/2008

OTHER PUBLICATIONS

Gibas, Michael; Canahuate, Guadalupe; Ferhatosmanoglu, Hakan, "Online Index Recommendations for High-Dimensional Databases Using Workloads." IEEE Transactions on Knowledge and Data Engineering, vol. 20, No. 2, Feb. 2008. Retrieved from the Internet: <http://ieeexplore.ieee.org/Xplore/login.jsp?url=http%3A%2F%2Fieeexplore.ieee.org%2Fiel5%2F69%2F4409559%2F04358967.pdf%3Farnumber%3D4358967&authDecision=-203>. Retrieved on Feb. 16, 2010.

(Continued)

*Primary Examiner* — Binh V Ho
(74) *Attorney, Agent, or Firm* — Mollborn Patents, Inc.; Fredrik Mollborn (57) ABSTRACT

Methods and Apparatus, including computer program products, for maintaining indexes in a database management system. The database management system includes a table having table entries and an index data structure having index data structure entries, the index data structure relating to the table. The index data structure is updated synchronously with an insertion of table entries. The index data structure is maintained unchanged when the table entries are deleted. It is verified by an index-scan on the index data structure that a valid criterion is fulfilled for index data structure entries, and those index data structure entries that pass the valid criterion from the index-scan are returned.

20 Claims, 6 Drawing Sheets

(56) References Cited

U.S. PATENT DOCUMENTS

2008/0154994 A1 6/2008 Fischer et al.
2008/0249990 A1 10/2008 Baby et al.
2008/0275840 A1 11/2008 Burger et al.
2010/0036886 A1* 2/2010 Bouloy et al. ............... 707/200
2010/0306222 A1* 12/2010 Freedman et al. ............ 707/759

OTHER PUBLICATIONS

Updated Statistics. SQL Team.com. Retrieved from the Internet: <http://www.sqlteam.com/forums/topic.asp? TOPIC_ID=96416>. Retrieved on Feb. 23, 2010.

Event Mechanism. DSpace Wiki. Retrieved from the Internet: <http://wiki.dspace.org/index.php/EventMechanism>. Retrieved on Feb. 23, 2010.

U.S. Appl. No. 13/082,174 Non-final Office Action. Notification Date Sep. 11, 2012.

U.S. Appl. No. 13/082,174 Final Office Action. Notification Date Jan. 18, 2013.

Seshadri, Praveen; Swami, Arun, "Generalized Partial Indexes." Proceeding: ICDE '95 Proceedings of the Eleventh International Conference on Data Engineering, IEEE Computer Society Washington, DC, USA 1995.

Sartori, Claudio; Scalas, Maria Rita, "Partial Indexing for Nonuniform Data Distributions in Relational DBMS's." IEEE Transactions on Knowledge and Data Engineering, v. 6, No. 3, Jun. 1994.

U.S. Appl. No. 13/082,174 Non-final Office Action. Notification Date Aug. 28, 2014.

* cited by examiner

SYSTEM AND METHOD FOR PARTIALLY DEFERRED INDEX MAINTENANCE

CROSS REFERENCE TO RELATED APPLICATIONS

This application claims priority to European Patent Application No. EP 10169375.2, filed on Jul. 13, 2010, and titled "System and Method for Partially Deferred Index Maintenance", the entire content of which is incorporated herein by reference.

BACKGROUND

The various embodiments of the invention relate generally to maintaining indexes in a database management system. Modern database management systems, in particular relational databases, use indexes for a faster access to large database tables. The indexes are typically stored separately from the table storing the content and need to be maintained for table modification operations such as row inserts, deletes and those updates that change the value of the columns that make up the index key.

The maintenance of an index is typically performed automatically and synchronously with a table change by the database management system (DBMS). Index maintenance in relational database systems is a resource intensive task because each index that exists on a given table has to be adjusted for each and every insert, update, and delete (IUD) operation. Such maintenance is also needed when the index is rarely, or even not at all, used for any queries or other database operations. Performance overhead may occur but is not desired.

All modern database management systems implement some variation of B-trees as index structures, in particular B*-trees or B+-trees. These structures associate each leaf with index keys and row identifier (RID), which may be comprised of a few bytes containing the page number on which the row may be placed and a position of the row on the page. The tree structure of indexes grows and shrinks when values are inserted or removed.

During insertion, a leaf page into which a value is to be inserted may be searched. This may start at the root page and may follow the path of the sort order down to the leaf page into which the value belongs. If the leaf page is already filled, the new value cannot be inserted. In such a case, a new page may be allocated to the index, a part of the overfull index page may be moved to the new page, and additionally the parent node may be adjusted by adding a new guiding value to it to refer to the new page. It may happen that the parent node is already full and would need to be split as was just described. This splitting may propagate through the whole tree up to the root node. Aside from the actual operation to search for the leaf page and inserting the new entry there, page splitting may incur an even higher overhead. Here, the terms node and page may be used synonymously because the implementations of B-trees typically map a B-tree node to a database page.

Removing a value from an index also requires a search for the respective index entry, again starting from the root node. If the number of index entries on the page falls below a certain threshold, the page may be merged/melted with its sibling pages. Such a merge results in the removal of a guiding value in the parent node, which implies that the merging may propagate up to the root node as well.

Several techniques are used to reduce the costs on index maintenance as it is roughly outlined here. For example, database systems may just mark index entries or index data structure entries as being deleted without removing them and performing any merge operations. The underlying assumption is that a new entry will soon occupy the space of the index entry.

U.S. Patent Application Publication No. 2006/0074977 discloses techniques by which updates may be incorporated in database indexes without causing deadlocks of user transactions. In one embodiment, referred to as immediate-incorporate, updates are incorporated in the index at the time of occurrence of a data manipulation language command execution. In a particular embodiment, R-tree updates are incorporated as part of a system transaction. The system transactions are part of update changes to the index but do not make them visible to other transactions. At commit time, the changes are made visible to other transactions.

In another document, U.S. Pat. No. 5,806,058, it is disclosed that associated records for each index key values, included in each index are counted, and when the number of associated data records has reached a predetermined number, the database is directly accessed without passing through an index record having the index key value. As one concrete method thereof, the index key value is deleted from the index portion of the database or the index file.

Thus, there may be a need for an improved architecture for maintaining indexes in a database management system such that performance requirements are easily met while managing large data volumes. This may be equivalent to a need for reducing index maintenance overhead during a transaction that performs an IUD operation while still maintaining consistency of indexes.

SUMMARY

In one aspect, the various embodiments of the present invention provides methods and apparatus, including computer program products, for maintaining indexes in a database management system. The database management system includes a table having table entries and an index data structure having index data structure entries, the index data structure relating to the table. The index data structure is updated synchronously with an insertion of table entries. The index data structure is maintained unchanged when the table entries are deleted. It is verified by an index-scan on the index data structure that a valid criterion is fulfilled for index data structure entries, and those index data structure entries that pass the valid criterion from the index-scan are returned.

The details of one or more embodiments of the invention are set forth in the accompanying drawings and the description below. Other features and advantages of the invention will be apparent from the description and drawings, and from the claims.

DESCRIPTION OF THE DRAWINGS

Embodiments of the invention will now be described, by way of example only, and with reference to the following drawings.

DETAILED DESCRIPTION

Terminology

It should be noted that entries in the context of the independent claims are used as category expressions and may denote also one single entry. In the context of this application, the following expression conventions have been followed:

Database management system (DBMS)—A database management system may be a set of computer programs and/or hardware components that control a creation, maintenance, and/or the use of the database with a computer as a platform. A DBMS may use any of a variety of database models, such as a network model or a relational model.

Database table—In relational databases and flat file databases, a table may be a set of data elements (values) that may be organized using a model of columns, which may be identified by their name and rows. A table may have a specified number of columns, and may have any number of rows.

Database index—A database index may denote a data structure, in particular an index data structure that may contribute to a fast access in the context of data retrieval operations on a database table. Indexes may be created using one or more columns of a database table, providing the basis for both, rapid random look-ups and efficient access of ordered records. Index data structures may be implemented in form of a table or in form of a tree structure, in particular, in form of a B-tree structure. Other index data structures like AVL-trees or Hash Maps may be possible. An index data structure or simply index may comprise one or more index data structure entries.

Synchronous index maintenance—In a synchronous index maintenance mode, the index content may be modified as part of a corresponding table content modifying operation, e.g., within one SQL or other data manipulation language statement. That is, the index data structures modifications are performed synchronously with a content modification, i.e., the index may be current with the corresponding table content.

Asynchronous index maintenance—In an asynchronous index maintenance mode the index data structure content is modified outside the scope of the corresponding table content modifying operation. Such an index is generally not current.

Updating a database table—The term updating may denote a modification of a database table. That may include a modification to an existing database table entry in that one or more values of fields of a database record may be changed, or it may denote an insertion or a deletion of a new entry in a database table.

Maintaining—This term may denote that something may be kept current on a time basis. A counter may be increased with every event that happens or a database table may be updated with an event demanding an update.

Verifying—The term verifying may denote a comparison of two values. A positive result of a verification may be that both values are identical, or that a certain condition is met.

Valid/invalid index entry—The term valid index data structure entry may denote an entry in an index table that corresponds to an existing table entry, wherein the table entry and the index table entry correspond to each other. An invalid index entry may not have a corresponding table entry. In this case, the index entry may refer to a non-existent or invalid table entry, e.g., an invalid row in the database table.

Deletion of an entry in a database table—A deletion may denote that an entry in a table is physically over-written, or just marked as being deleted. In this case, the content of an entry still exists and only a flag is set marking the content as deleted.

Over-writing—This term may denote that a physical space in the database system, e.g., a table, may change values that are stored. No new physical space may be required.

Log record—A log record is a data structure logging changes made to a database. These changes may be made to a normal table or an index data structure. The term change may denote a deletion of an entry, an insert of an entry or an update of an entry. Read operations are typically not logged. Each entry in the log record may have an associated log sequence number or log record sequence number. Such a number is increased with every new entry into the log record.

Index-scan—An index-scan may denote a read operation against an index data structure, e.g., an index table. It may well be that the data in the index data structure repeats one or more data fields of the related table in the database. Index data structure may typically be much smaller than original content tables. Thus, they may be much faster to read. If, for a read operation, the fields in an index table are sufficient, it is much more efficient to just read the index data structure instead of a complete data table.

In the method for maintaining indexes in a database management system, the updating may in particular denote a change or update of an existing entry or an insertion of a new entry. In case of a table, it may mean a new row.

Maintaining the index data structure unchanged in the method for maintaining indexes in a database management system may denote keeping the complete index data structure unchanged, i.e., no update or deletion may be performed.

It should also be noted that in case entries are mentioned, it may well be that only one entry is actually meant. Entries are used as a category and not in the pure sense of a plurality.

When referring to returning entries of table or index data structures, it may denote a group of data elements that are delivered in response to a data manipulation language operation, e.g., an SQL statement. The data or entries may be returned to a user or a process inside a computer or computer network that may have generated the SQL statement. This procedure may be implemented by i.e., piping.

Advantages and General Implementation Considerations

The techniques described herein for maintaining a set of indexes in a database management system and the associated database management system may provide several advantages. Some examples of such advantages are presented in the following paragraphs.

The various techniques described herein may particularly be useful in cases in which many deletions are made in database tables, but an insertion of an entry in the database may be more rare. The performance overhead incurred by deletion of a table entry and at the same time updating, i.e., deleting, index entries may result in unnecessary overhead. Thus, deferring maintenance of index data structures may be a viable alternative, especially for the case of a deletion in a content table of a DBMS. A low priority process of the database management system may take care of invalid index data structure entries. The performance of insert operations may also benefit from the inventive methods described herein since index pages that are relevant to delete operations may not need to be brought into a real storage buffer pool. Hence, the buffer pool may be optimized for insertions.

In one embodiment, the fulfillment of the valid criterion may include verifying for each index data structure entry that a corresponding table entry exists, and verifying for each index data structure entry that corresponding field values of the index data structure entry, and the table entry are identical. Such a procedure may be required because there—at the time of an index-scan—may be index data structure entries that may not have corresponding entries in a table of the database. Thus, it is advantageous to verify during an index-scan that an entry of an index data structure is valid. A validation may be made by the above mentioned procedure. The first part of the verification—the existence test—may be required for rows in the database table that may have been deleted. Such verification may be performed on the basis of a row identifier (RID). If the RID stored in the index data structure may point to an entry on a page in a database with an identical RID, the first verification phase may be successful.

The second verification phase may be content comparison of corresponding field entries in the index data structure and the table. If both data structures are implemented as tables, the verification may be a field comparison.

The second verification part covers the situation that a new row may now be stored at the place of a previous deleted row in the table, and the index data structure entry may still refer to that previously deleted row. It should be noted that the new row place and the previous deleted one may have been inserted but have not yet been committed. This shows that regular locking on the row may be needed when being retrieved—depending on a current isolation level.

Thus, index-only predicate evaluation may not be possible because the index data structure entries may be invalid. The data may have to be fetched from the table of the database. And the predicate that was used for scanning the index data structure may have to be evaluated again on the row of the table itself.

In another embodiment, a table entry is updated as a sequence of deleting a table entry and inserting a new table entry. This way, only two operations have to be detailed.

In another embodiment, the a first table entry is deleted, wherein the first table entry is associated with a first value of a row identifier, inserting a second table entry, wherein the second table entry is associated with a second row identifier, checking that the first and second values of the row identifiers are identical, and if the checking delivers that the row identifiers are identical, comparing all values of all fields of a first index data structure entry, corresponding to the first table entry with all values of corresponding fields of a second index data structure entry, corresponding to the second table entry, and if the comparison results in equal values of all corresponding fields of the first and second index data structure entries, maintaining the index data structure unchanged.

In particular, the checking that the row identifiers may have a positive result, because the index data structure entry may not yet have been deleted and the new entry of the table may have been given—by accident—the same physical space in the database. This may be seen as a special situation because it may simply not be required to generate a new index data structure because then two entries may exist with the same RID. The verification test mentioned above may not identify the one of the two index data structure entries as being invalid because both may refer to a valid row in the table, the same row—actually.

In yet another embodiment, an index-scan is used for a deletion of one table entry, and deleting the index data structure entry corresponding to the one table entry synchronously while deleting the one table entry. In particular, this method may also be applied for more than one index data structure during one index-scan. Actually, all invalid entries in the index data structure may be deleted during an index-scan. As a result, the index data structure may be cleaned-up and potentially for a short amount of time, which may be not predictable, sort of synchronized with the corresponding table after an index-scan.

In one embodiment, an invalid index data structure entry is deleted during a query, wherein the query uses the index data structure. In particular, an invalid index data structure may be a data structure that does not pass the verification or valid criterion mentioned above. This kind of a query may for its effect to the index data structure be comparable to an index-scan based delete of an entry in the table, as just described. The index data structure may be cleaned-up.

In a further embodiment, a subset of table entries is loaded together with corresponding index data structure entries into a main memory of a computer system, and deleting invalid index data structure entries being loaded into the main memory. In particular, the loading may be a loading into a cache memory. Such a caching of data from a database table being stored on a hard drive, along with corresponding index data structure entries, may speed-up a clean-up of invalid index data structure entries because data manipulation in the cache is much faster compared to data manipulation on hard drives. During a read of a table entry, a complete hard drive page may be copied into a cache memory. In this case, a specific process may clean-up invalid index data structure entries.

Again, invalid index data structures are those that do not fulfill the valid criterion. The cache may actually be a database buffer pool, thus, reducing I/O overhead for a deferred maintenance of index data structures. The amount of invalid index data structure entries may be reduced.

In yet another embodiment, an invalid index data structure entry is over-written during an insert of a table entry, in case the index data structure indicates uniqueness of the table entry. In particular, uniqueness of a table entry may be achieved by a primary key, which is by definition unique. There may not by any other entries in a database table with an identical primary key at the same time. Over-writing, in particular, may denote an update of a table entry using a unique key. Secondary keys may also be stored in index data structures that do not define uniqueness. An optimization may be to remove invalid index data structure entries when inserting new values because an update may be treated as a sequence of a deletion and an insertion. A duplicate index data structure entry may be deleted anyway. If it may be a valid index data structure entry, a real duplicate may be found and the insert must fail. If it may be an invalid index data structure entry, it may directly be over-written by the new index data structure entry.

In one embodiment, a log record is maintained for operations in the database management system, wherein the log record includes a log record sequence number that is increased with every new entry into the log record, deleting an index data structure entry asynchronously to a corresponding table entry, setting a value of a marker, identical to the log record sequence number associated to a latest deletion operation of an index data structure entry deleted, comparing, before performing an index-scan, the log record sequence number of the operation of the index-scan with the value of the marker, and if the value of the marker is larger or equal than the log record sequence number of the index-scan, performing the index-scan.

In particular, asynchronously deleting index data structures may refer to the deferred index data structure deletion as described above. This feature may also be combined with other features of the various embodiments of the invention.

It may also be mentioned that log record sequence numbers or log record numbers may only be assigned to operations like insert, delete, or update; basically, to everything that may change the content of the database table or an index data structure. A read operation, e.g., a query or an index-scan, may not result in a new or increased log sequence number. However, also read operations against tables or index data structures may request from a log management system a potential log sequence number, referring to a log sequence number that would be used next for a change operation on a respective database table. Such a sequence number may define a "high water mark" in log the record.

For instance, the log record, identified by its log record sequence number or relative byte address (RBA)) of a delete operation affecting an index data structure page may be maintained along with the index data structure page—but not stored on the index page because that may require modifications to the page, which may be avoided. So, a separate mapping may be kept. The mapping may store for each index data structure page the log sequence number of the delete operation. If the log record of the start of the transaction of a query may be later then this 'last delete' log record for the index data structure page, it may not be ensured that all index data structure entries may still be valid and may then allow index-only access, avoiding an additional fetching of the table entries itself.

The mapping of log record sequence numbers/index pages may be held in main-memory only. It does not have to be persistent. When accessing the index pages, it can be maintained. Note that the mapping is much more compact because it operates on index page level instead of index entry level.

In another embodiment, a computer system is provided comprising a database management system as described above, wherein the computer system comprises a processing unit, adapted for processing data to operate the database management system, a storage unit, for storing the table and the index data structure and being accessible by the processing unit.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The aspects defined above and further aspects of the present invention are apparent from the examples of embodiments to be described hereinafter and are explained with reference to the examples of embodiments, but to which the invention is not limited.

In the following, a detailed description of the drawings will be given. All illustrations in the drawings are schematic.

Exemplary Embodiments

Figure 1A:
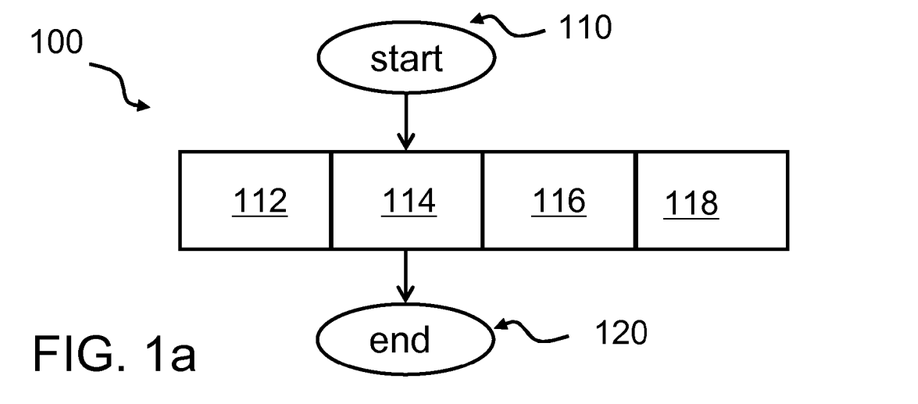
FIG. 1a shows a block diagram of an embodiment of the method for maintaining indexes in a database.

FIG. 1a shows an embodiment of a method 100 for maintaining indexes in a database. It shows a block diagram of an insertion of an entry into a table. After a start 110 of the method, an update may be performed, 112, to an index data structure when a new entry is made to a table of the DBMS. Block 114 denotes that a corresponding index data structure, which may be an index table, is maintained unchanged during a data manipulation language execution, e.g., an SQL statement, updating a corresponding table. Block 116 refers to an index-scan that implies a verification of a valid criterion before returning, 118, back valid index data structure entries based on the data manipulation language. The method ends with the end 120.

Figure 1B:
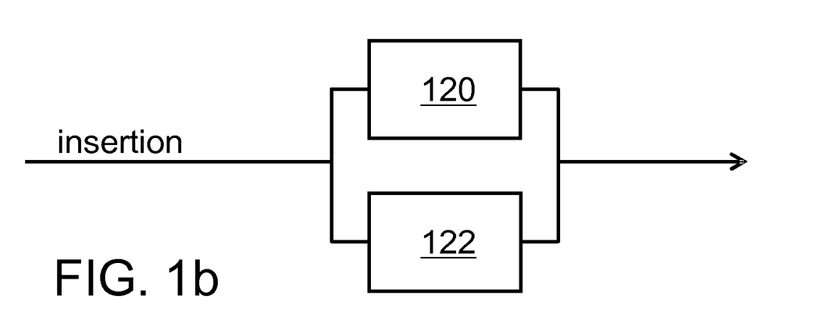
FIG. 1b shows a block diagram of an insertion of an entry into a table, in accordance with one embodiment.

In FIG. 1b the insertion part is detailed. Reference numeral 120 may denote an insert of an entry into a database table. Reference numeral 122 may denote that a corresponding index data structure may be maintained, i.e., updated during the insert operation.

Figure 1C:
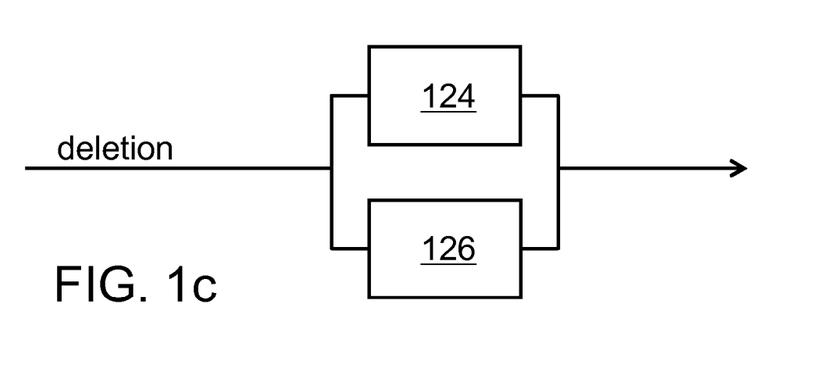
FIG. 1c shows a block diagram of deletion of an entry in a table of a database, in accordance with one embodiment.

FIG. 1c may denote an asynchronous or deferred deletion of an index data structure. Reference numeral 124 may denote a deletion of a table entry, while block 126 may symbolize that a corresponding index data structure is blocked from updating or deleting. Thus, the corresponding index data structure is not changed during a deletion of a table entry. The index data structure may be deleted later by an asynchronous database process. Therefore one may say that the index data structure is partly maintained in a deferred way, even if only applied to deletions.

Figure 1D:
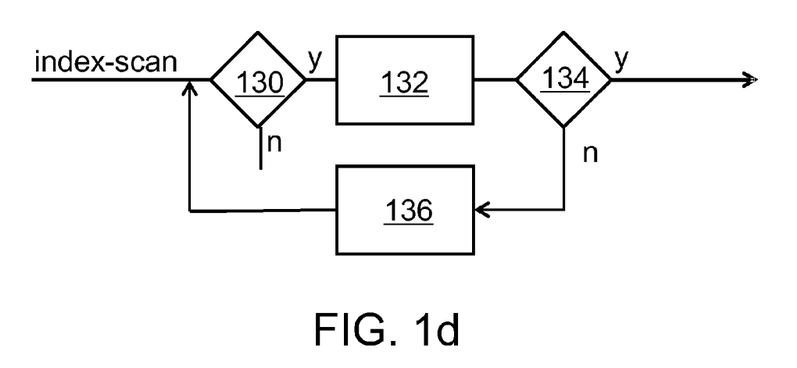
FIG. 1d shows a block diagram of an index-scan, in accordance with one embodiment.

FIG. 1d details an index-scan. Before returning valid entries from an index-scan, which may be equivalent to a read operation against an index data structure, a valid criterion has to be passed, 130. This is because invalid index data structure entries may be in the index data structure due to not having them deleted together with table entries.

FIG. 1d shows a block diagram of a verification step during an index-scan of an embodiment of the invention. Block 130 illustrates a verification of an index data structure entry verifying a valid criterion. If that condition is met the index data structure entry is returned, 132, to a user or a process having issued the index-scan operation. This is repeated until the last index data structure entry is reached, blocks 134 and 136. In particular, compliance to a valid criterion may be checked by a process as illustrated in FIG. 3.

Figure 2:
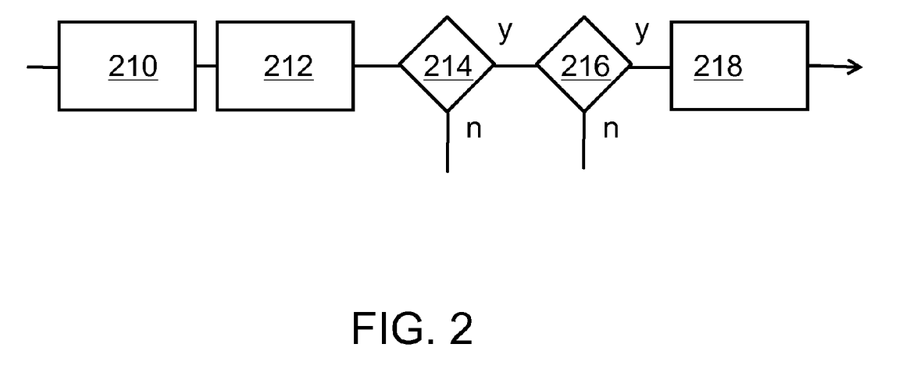
FIG. 2 shows a block diagram of a verification step, in accordance with one embodiment.

FIG. 2 illustrates a block diagram of a verification step of an embodiment of the invention. Block 210 may symbolize a deletion of a table entry. Block 212 may symbolize an insertion of a new entry in the same table in the database. In block 214 it is checked or verified that both row identification numbers (RIDs) of the deleted and the inserted rows are identical. Next, in step 216 it may be verified that all values of all fields of the related index data structures are identical. If that may be the case, then the new entry got—by accident—the same location with the same RID as the deleted entry. In this case, the index data structure may not need to be updated, deleted or changed. It may be kept unchanged, 218. The index data structure entry may already point to the right location in the table in the database management system.

Figure 3:
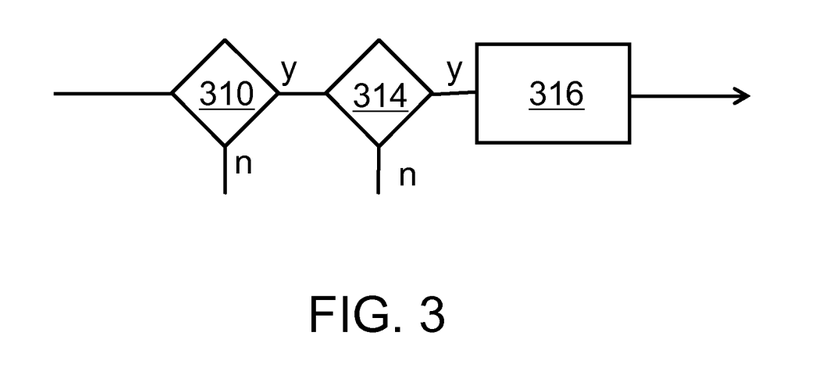
FIG. 3 shows a block diagram of an embodiment of the invention.

FIG. 3 shows in block 310 a first verification step: Verifying for each index data structure entry that a corresponding table entry exists to the index data structure entry. In a second step 314 is may be verified for each index data structure entry that corresponding data values of the index data structure entry and the table entry are identical. The first and second verification steps may also be performed in a reverse order. In block 316, the index data structure entries are returned to a requestor, e.g., a person or a process, having issued the index-scan operation.

Figure 4:
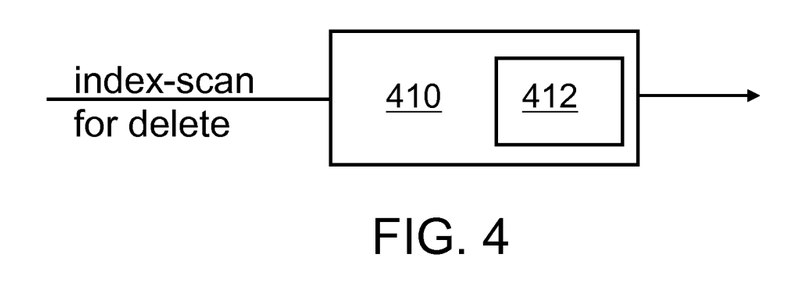
FIG. 4 shows a block diagram for a synchronous deletion of an index data structure entry, in accordance with one embodiment.

FIG. 4 shows a sequence of steps being performed during a clean-up of index data structures entries during an index-scan being performed in order to delete a table entry. In block 410, an index-scan may be performed and during that index-scan a corresponding index data structure entry may be deleted, together with the deletion of a table entry, 412.

Figure 5:
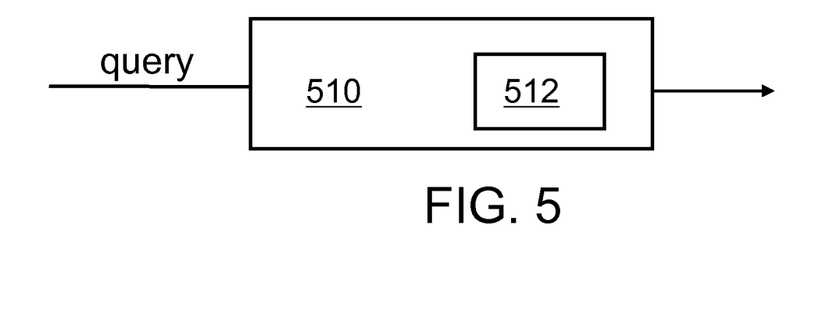
FIG. 5 shows a block diagram of an embodiment of the invention.

FIG. 5 shows a sequence of step being performed during a clean-up of index data structures entries during a read operation 510. An index data structure may be used for finding the right table entry. In block 512 an index data structure entry is deleted, while the access to table entries in performed via an index consisting of index data structure entries.

Figure 6:
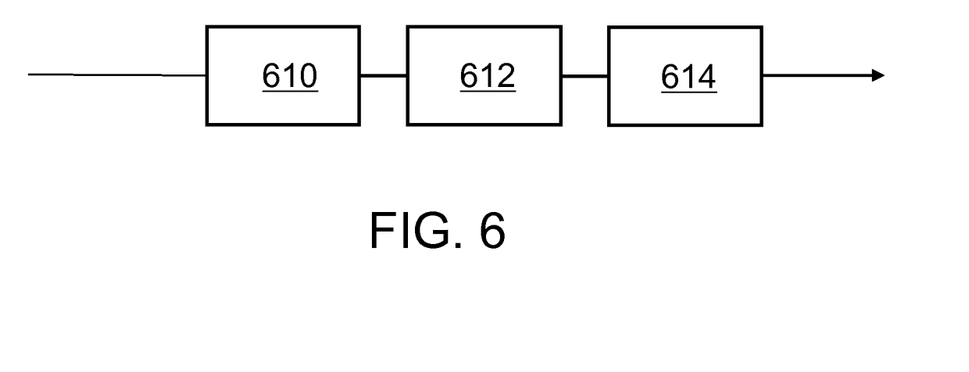
FIG. 6 shows a block diagram of an embodiment of the invention.

FIG. 6 illustrates a deletion of invalid index data structure entries during caching of data in a buffer pool of a computer system. In block 610 parts of a database table is loaded into a buffer pool for caching the data. This is performed together with corresponding index data entries. Data being in the buffer pool may be much faster accessible than from a hard drive. A separate database management system process may verify the index data structure entries being loaded into the buffer pool against the valid criterion, 612. If the valid criterion is not met for an index data structure entry, the corresponding index data structure entry may be deleted, 614. Alternatively, the index data structure entry may only be marked as invalid or deleted as it may also be the case for other deletion operations.

Figure 7:
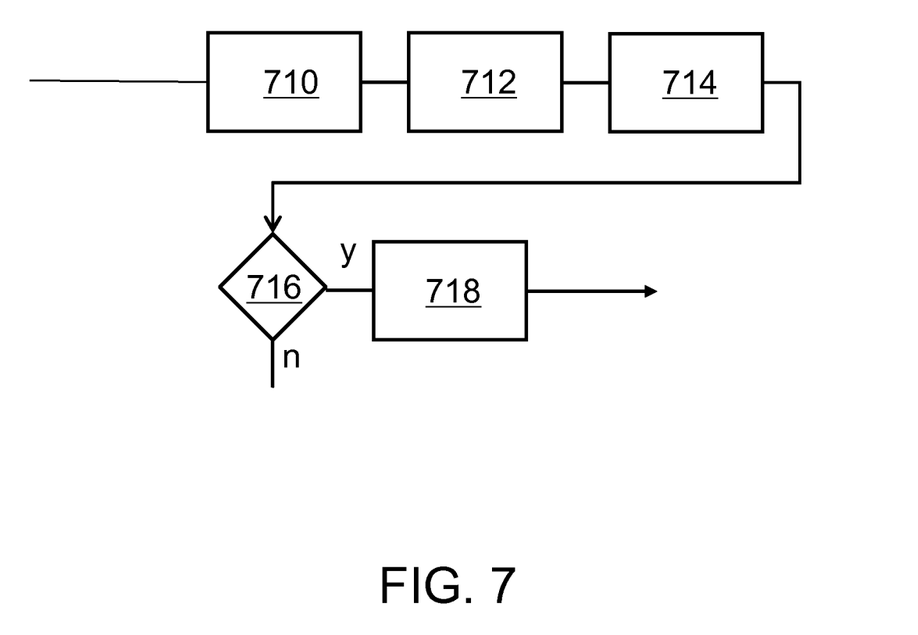
FIG. 7 shows a block diagram of an exemplary read operation of an embodiment of the invention.

FIG. 7 shows a block diagram of an exemplary read operation of an embodiment of the invention. This sequence of steps illustrates a use case as a consequence of a deferred deletion of index data structure entries. First, in block 710, a log record is maintained for every database changing operation like insertion, deletion or updating of entries of any kind. The log record may be stored per database table, per group of database tables or for a complete database. Every entry into the log record storage area—which may be a file—may get a log record sequence number or log sequence number assigned. With every new log record a new log record number is assigned that may be increased compared to the previous log sequence number. With this structure the sequence of changes may be determined. A meaningful usage of such a structure is a roll-back operation in a database. However, here, the log sequence number may also be used for a different purpose. Invalid index data structure entries may exist in an index data structure because of a deferred maintenance/deletion of index data structure entries as described above, 712. There may also be a marker being set, 714, that may correspond to that operation that marks the latest deletion of an index data structure entry. Because read operation may be performed asynchronously to deletions of index data structure entry they may have been started earlier than a deletion of an index data structure entry. In case of an index-scan, it may not be required to read the corresponding table and perform the valid criterion verification because one may assume that the index data structure is already cleaned-up.

Block 712 refers to an asynchronous maintenance of index data structure entries. Block 714 refers to setting of the marker as just described. In block 716, it is verified that the marker of the latest deletion of an index data structure is greater or equal to a potential log sequence number of a read operation, in particular an index-scan. If the above mentioned comparison returns a "true" then the index-scan may be performed, 718, without performing a valid criterion verification. The index data structure may just be read "as is". This may increase a performance of index-scans.

Figure 8:
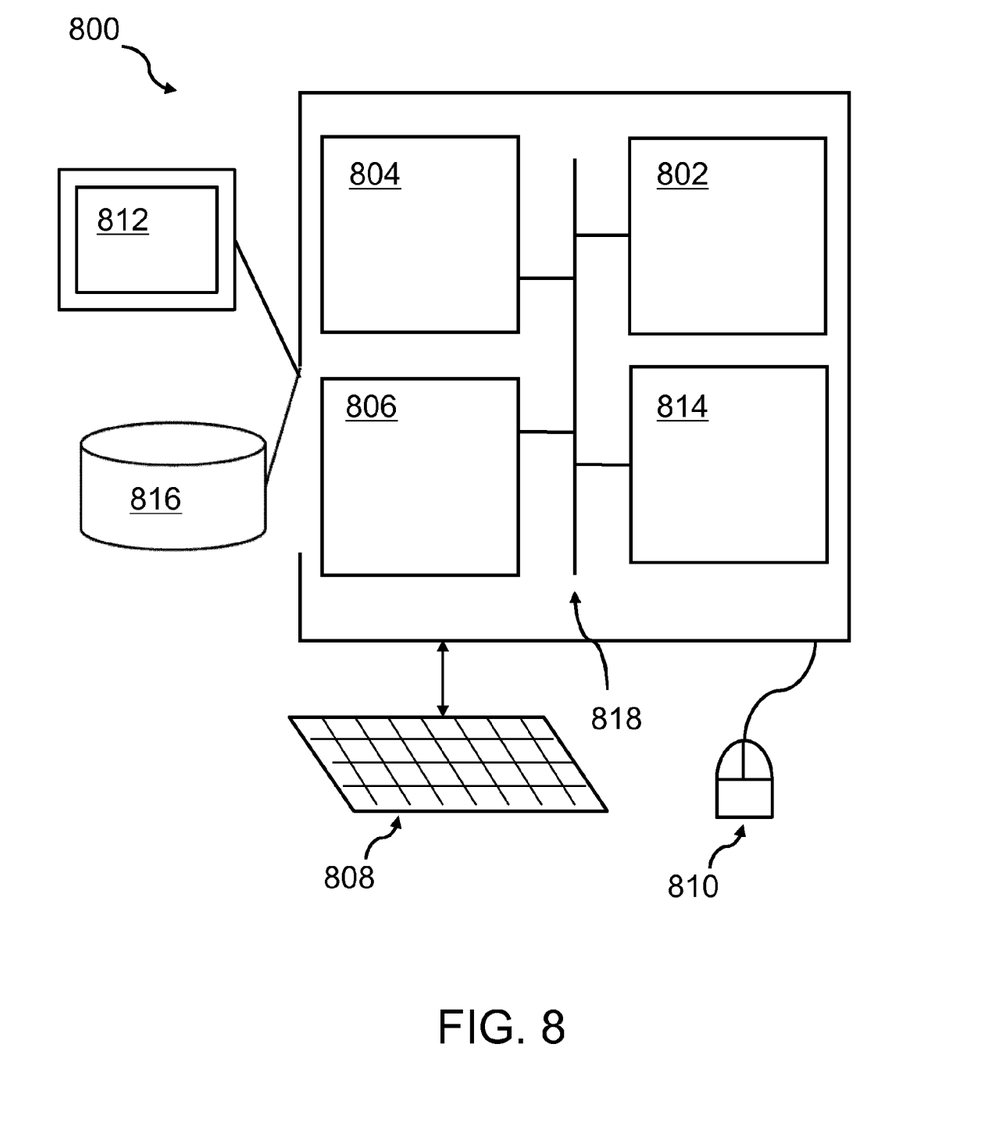
FIG. 8 shows a block diagram of a computer with components for executing a method for maintaining indexes in a DBMS, in accordance with one embodiment.

Embodiments of the invention may be implemented on virtually any type of computer, regardless of the platform being used suitable, for storing and/or executing program code. For example, as shown in FIG. 8, a computer system 800 includes one or more processor(s) 802 with one or more cores per processor, associated memory elements 804 an internal storage device 806 (e.g., a hard disk, an optical drive such as a compact disk drive or digital video disk (DVD) drive, a flash memory stick, etc.), and numerous other elements and functionalities (not shown), typical of today's computers. The memory elements 804 may include a main memory, employed during actual execution of the program code, and a cache memory, which provides temporary storage of at least some program code or data in order to reduce the number of times, code must be retrieved from external bulk storage 816 for an execution. Elements inside the computer 800 may be linked together by means of a bus system 818 with corresponding adapters.

The computer 800 may also include input means, such as a keyboard 808 a mouse 810 or a microphone (not shown). Furthermore, the computer 800 may include output means, such as a monitor 812 [e.g., a liquid crystal display (LCD), a plasma display, or cathode ray tube (CRT) monitor]. The computer system 800 may be connected to a network (e.g., a local area network (LAN), a wide area network (WAN), such as the Internet, or any other similar type of network, including wireless networks via a network interface connection 814. This allows a coupling to other computer systems. Those skilled in the art will appreciate that many different types of computer systems exist, and the afore-mentioned input and output means may take other forms. Generally speaking, the computer system 800 includes at least the minimal processing, input and/or output means, necessary to practice embodiments of the invention, in particular, the method for maintaining indexes in a database management system and run the database management system as described above.

Figure 9:
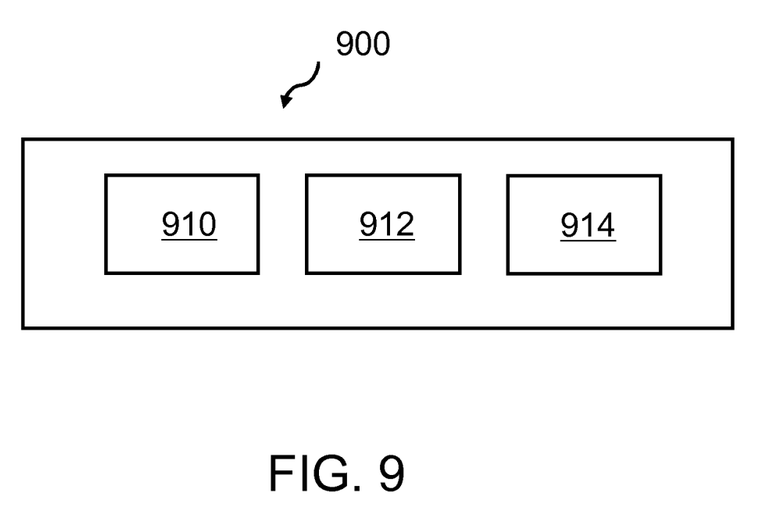
FIG. 9 shows a block diagram of a database management system according to an embodiment of the invention.

FIG. 9 shows a block diagram of a database management system 900 according to an embodiment of the invention. Block 910 refers to an updating unit, adapted for updating the index data structure synchronously, with an insertion of table entries. A maintaining unit 912 may be adapted for maintaining the index data structure unchanged when table entries are deleted. And a verifying unit 914 may be adapted for verifying by an index-scan on the index data structure that a valid criterion is fulfilled for index data structure entries that pass the valid criterion from the index-scan.

Further, those skilled in the art will appreciate that one or more elements of the afore-mentioned computer system 800 may be located at a remote location and connected to the other elements over a network. Further, embodiments of the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor with shared memory and/or resources.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A method for maintaining indexes in a database management system, the database management system comprising a processor and a memory storing a table having table entries and an index data structure having index data structure entries, the index data structure relating to the table, the method comprising:
   updating, by the processor, a monotonously increasing counter of the index data structure synchronously with an insertion of table entries;
   maintaining by the processor, the index data structure unchanged when the table entries are deleted; and
   verifying by the processor, by checking the value of the monotonously increasing counter of the index data structure that a valid criterion is fulfilled for index data structure entries, and returning by the processor, index data structure entries that pass the valid criterion from the index-scan.

2. The method according to claim 1, wherein the fulfillment of the valid criterion comprises:
   verifying for each index data structure entry that a corresponding table entry exists; and
   verifying for each index data structure entry that corresponding field values of the index data structure entry and the table entry are identical.

3. The method according to claim 1, further comprising:
performing an update of a table entry as a sequence of deleting the table entry and inserting a new table entry.

4. The method according to claim 1, further comprising:
deleting a first table entry, wherein the first table entry is associated with a first value of a row identifier;
inserting a second table entry, wherein the second table entry is associated with a second row identifier;
checking that the first and second values of the row identifiers are identical;
in response to determining that the row identifiers are identical, comparing all values of all fields of a first index data structure entry corresponding to the first table entry with all values of corresponding fields of a second index data structure entry corresponding to the second table entry; and
in response to determining that the comparison results in equal values of all corresponding fields of the first and second index data structure entries, maintaining the index data structure unchanged.

5. The method according to claim 1, further comprising:
using an index-scan for a deletion of one table entry; and
deleting the index data structure entry corresponding to the one table entry synchronously while deleting the one table entry.

6. The method according to claim 1, further comprising:
deleting an invalid index data structure entry during a query, wherein the query uses the index data structure.

7. The method according to claim 1, further comprising:
loading a subset of table entries, together with corresponding index data structure entries, into a main memory of a computer system; and
deleting invalid index data structure entries being loaded into the main memory.

8. The method according to claim 1, further comprising:
over-writing an invalid index data structure entry during an insert of a table entry in case the index data structure indicates uniqueness of the table entry.

9. The method according to claim 1, wherein the monotonously increasing counter is maintained in a log record for operations in the database management system, further comprising:
deleting an index data structure entry asynchronously to a corresponding table entry;
setting a value of a marker, identical to the value of the monotonously increasing counter associated with a latest deletion operation of an index data structure entry deleted;
comparing, before performing an index-scan, the value of the monotonously increasing counter of the operation of the index-scan with the value of the marker; and
in response to determining that the value of the marker is larger or equal than the value of the monotonously increasing counter of the index-scan, performing the index-scan.

10. A database management system for maintaining indexes, the database management system having a table with table entries and an index data structure having index data structure entries, comprising:
a processor;
a memory containing instructions executable by the processor to perform operations within the database management system;
an updating unit operable to update a monotonously increasing counter of the index data structure synchronously with an insertion of table entries;
a maintaining unit operable to maintain the index data structure unchanged when table entries are deleted; and
a verifying unit operable to verify by checking the value of the monotonously increasing counter of the index data structure that a valid criterion is fulfilled for index data structure entries that pass the valid criterion from the index-scan.

11. A computer system, comprising:
a database management system for maintaining indexes, the database management system having a table with table entries and an index data structure having index data structure entries, comprising:
an updating unit operable to update a monotonously increasing counter of the index data structure synchronously with an insertion of table entries;
a maintaining unit operable to maintain the index data structure unchanged when table entries are deleted; and
a verifying unit operable to verify by checking the value of the monotonously increasing counter of the index data structure that a valid criterion is fulfilled for index data structure entries that pass the valid criterion from the index-scan;
a processor operable to process data to operate the database management system; and
a memory, storing the table and the index data structure and being accessible by the processor.

12. A computer program product for maintaining indexes in a database management system, the database management system comprising a table having table entries and an index data structure having index data structure entries, the index data structure relating to the table, the computer program product comprising:
a non-transitory computer readable storage medium having computer readable program code embodied therewith, the computer readable program code comprising:
computer readable program code configured to update a monotonously increasing counter of the index data structure synchronously with an insertion of table entries;
computer readable program code configured to maintain the index data structure unchanged when the table entries are deleted; and
computer readable program code configured to verify by checking the value of the monotonously increasing counter of the index data structure that a valid criterion is fulfilled for index data structure entries, and returning index data structure entries that pass the valid criterion from the index-scan.

13. The computer program product according to claim 12, wherein the fulfillment of the valid criterion comprises:
verifying for each index data structure entry that a corresponding table entry exists; and
verifying for each index data structure entry that corresponding field values of the index data structure entry and the table entry are identical.

14. The computer program product according to claim 12, further comprising:
computer readable program code configured to perform an update of a table entry as a sequence of deleting the table entry and inserting a new table entry.

15. The computer program product according to claim 12, further comprising:
computer readable program code configured to delete a first table entry, wherein the first table entry is associated with a first value of a row identifier;

computer readable program code configured to insert a second table entry, wherein the second table entry is associated with a second row identifier;

computer readable program code configured to check that the first and second values of the row identifiers are identical;

computer readable program code configured to in response to determining that the row identifiers are identical, compare all values of all fields of a first index data structure entry corresponding to the first table entry with all values of corresponding fields of a second index data structure entry corresponding to the second table entry; and computer readable program code configured to maintain the index data structure unchanged in response to determining that the comparison results in equal values of all corresponding fields of the first and second index data structure entries.

16. The computer program product according to claim 12, further comprising:

computer readable program code configured to use an index-scan for a deletion of one table entry; and computer readable program code configured to delete the index data structure entry corresponding to the one table entry synchronously while deleting the one table entry.

17. The computer program product according to claim 12, further comprising:

computer readable program code configured to delete an invalid index data structure entry during a query, wherein the query uses the index data structure.

18. The computer program product according to claim 12, further comprising:

computer readable program code configured to load a subset of table entries, together with corresponding index data structure entries, into a main memory of a computer system; and computer readable program code configured to delete invalid index data structure entries being loaded into the main memory.

19. The computer program product according to claim 12, further comprising:

computer readable program code configured to over-write an invalid index data structure entry during an insert of a table entry in case the index data structure indicates uniqueness of the table entry.

20. The computer program product according to claim 12, wherein the monotonously increasing counter is maintained in a log record for operations in the database management system, further comprising:

computer readable program code configured to delete an index data structure entry asynchronously to a corresponding table entry;

computer readable program code configured to set a value of a marker, identical to the value of the monotonously increasing counter associated with a latest deletion operation of an index data structure entry deleted;

computer readable program code configured to compare, before performing an index-scan, the value of the monotonously increasing counter of the operation of the index-scan with the value of the marker; and computer readable program code configured to perform an index-scan in response to determining that the value of the marker is larger or equal than the value of the monotonously increasing counter of the index-scan, performing the index-scan.

* * * * *